United States Patent [19]

Donnally

[11] 4,214,231

[45] Jul. 22, 1980

[54] IN-BORE TELEMETRY INFORMATION MEASURING SYSTEM

[75] Inventor: William Donnally, Mine Hill, N.J.

[73] Assignee: The United States of America as represented by the Secretary of the Army, Washington, D.C.

[21] Appl. No.: 24,140

[22] Filed: Mar. 26, 1979

[51] Int. Cl.$^{2}$ .......... H04Q 9/00

[52] U.S. Cl. .......... 340/207 R; 340/347 AD

[58] Field of Search .......... 340/207 R, 347 AD; 324/162; 73/167

[56] References Cited

U.S. PATENT DOCUMENTS 3,761,917 9/1973 Brown .......... 340/347 AD

*Primary Examiner*—Harold I. Pitts

*Attorney, Agent, or Firm*—Nathan Edelberg; Robert P. Gibson; Max Yarmovsky

[57] ABSTRACT

There is disclosed an improved electronic system for measuring in-bore telemetry information for tube-fired munitions where high frequency transmission is desired to telemeter several frequency channels. The system includes a subsystem for sensing acceleration located inside a tube-fired projectile; a subsystem for conditioning and filtering a signal input; a subsystem for converting analog data by use of a Delta-Modulation method; a subsystem for binary recirculation, the same accomplishing repetition of measurement of the in-bore information; a binary shift register for conveying input digital data to a ground station facility through a transmission link; and a recording means placed in a ground station facility to accomplish storing, displaying and recording in-bore information.

13 Claims, 4 Drawing Figures

IN-BORE TELEMETRY INFORMATION MEASURING SYSTEM

GOVERNMENTAL INTEREST

The invention described herein may be manufactured, used, sold and licensed by or for the Government of the United States for governmental purposes without the payment to me of any royalty thereon.

BACKGROUND OF THE INVENTION

The present invention relates to the design, development and malfunction investigations of the tube-fired munitions. More particularly, the invention herein relates to a low cost system for the telemetering of delayed high-G in-bore information.

In the past, certain techniques for acquiring in-bore information have not been completely satisfactory in furnishing a complete environmental profile of a shell while in-bore. These techniques have included:

(1) Hardwiring of the shell transducer directly to recording equipment located outside the gun tube. This technique suffered from the problem of wire breakage at higher firing zones.

(2) Radio frequency transmission of in-bore data out of the gun tube to the ground station recording equipment. This has often been less than optimum due to blow-by gases attenuating the R.F. signal, reflections, and cancellations in the gun tube.

(3) Laser beam transmission of in-bore data out of the gun tube. This has not been successful due to difficult alignment problems of transmitter and receiver, and obscuration of the light beam by blow-by gases.

The aforementioned radio frequency technique utilized a particular charge-coupled analog delayed device (CCD) to delay in-bore information until the projectile clears the gun barrel and the ionized cloud.

The total cost of in-bore telemeter components in the present system would be less than half of the component cost of telemeters using charge-coupled devices to achieve the analog delay.

The present invention eliminates the above shortcomings in the prior art and, in so doing, presents a system which is both more effective and more economical than any previously known. The significant innovative areas of the invention disclosed herein include:

(a) The delay of analog signals achieved by means of Delta-Modulation (DM) and binary shift registers (S/R). This delay circuitry makes extensive use of digital logic components which can be fabricated and packaged at low cost.

(b) This technique utilizes digital logic components which can be operated over a wider temperature range than CCD devices. Temperature compensation and bias sources are not required, as in the case with CCD devices.

(c) Where a requirement to telemeter several moderate frequency response channels exists, a time-division multiplexing technique may be used to reduce overall hardware complexity with attendant cost saving.

(d) The component cost of the system is estimated to be one-half the cost of a CCD analog delay circuit for applications where moderate channel bandwidth is acceptable.

(e) A binary data recirculation technique for the simplification of delay circuitry and for improving the reliability of received in-bore telemetry data is easily implemented. This will reduce the required duration of time delay no longer than the duration of in-bore events.

PRIOR ART STATEMENT

The prior art is reflected in U.S. Pat. No. 3,761,917 (1973) to Brown, entitled "Gun Rugged Recorder". The main embodiments of Brown include means for taking time window samples, means for converting time window samples into digital form, a matrix, light emissive pulser, means for encoding the digital data into said pulser matrix, and high speed photographic film. The present invention differs from Brown in using a Delta-Modulation method and means for binary recirculation and, thereby, providing an economical and very effective system for measuring in-bore telemetry information for tube-fired munitions.

SUMMARY OF THE INVENTION

The present invention comprises an improved electronic system for measuring in-bore telemetry information for tube-fired munitions where high frequency response up to 20 KHZ is acceptable in order to telemeter several frequency channels. The invention comprises: means for sensing a plurality of levels of acceleration, said means disposed inside a tube-fired projectile; means for conditioning and filtering a signal output; means for converting analog data by a Delta-Modulation method; means for binary recirculation, said means accomplishing repetition of measurement of the in-bore information; and a binary shift register for conveying input digital data to a ground-station facility through a transmission link. The system further comprises a recording means placed in a ground-station facility wherein said recording means stores, displays and records said in-bore information.

It is an object of the present invention to provide an effective and economical system for the acquisition of in-bore information for tube-fired munitions, the same being of considerable benefit to weapon system designers.

Another object of the present invention is to provide an alternative system to replace existing, expensive, charge-coupled analog-delayed devices (CCD) for delaying in-bore information until the projectile clears the gun barrel and the ionized cloud.

A further object is to provide a recirculation technique to achieve high frequency response up to 20 KHZ.

A yet further object is to provide a system capable of furnishing a complete environmental profile of a shell while in-bore.

Yet further objects will become apparent from the hereinafter set forth Detailed Description of the Invention and the Drawings.

DETAILED DESCRIPTION OF THE INVENTION

Figure 1:
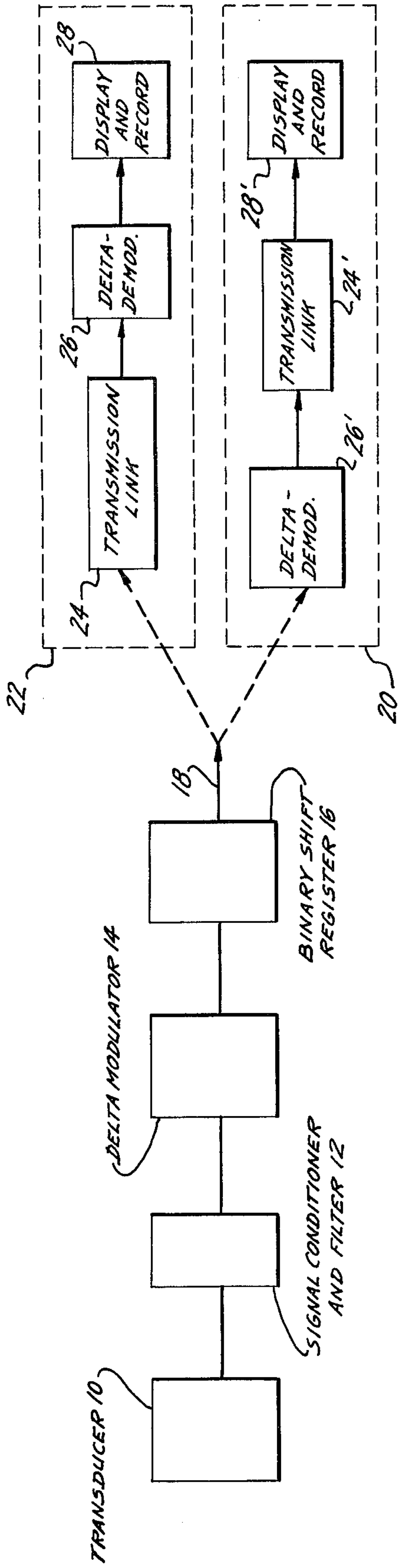
FIG. 1 is a block diagram of a single channel high-G telemeter incorporating a Delta-Modulation technique and binary shift register circuits to delay in-bore information.

FIG. 1 is a block diagram for a typical single channel in-bore telemeter with an associated transmission-receiving link. A transducer 10, which may be an accelerometer, pressure transducer, switch-closure monitor, strain gage, etc., is mounted inside the tube-fitted projectile. The transducer measures a plurality of levels of acceleration.

The output signal from the transducer 10 is filtered and conditioned by a signal conditioner and filter 12, which comprises a low pass filter an an amplifier.

A Delta-Modulator 14 encodes the continuous signal into a discrete binary bit sequence which is fed to clocked N-stage binary shift register 16. A delayed binary sequence at 18 is then fed to either an analog modulation system 20 or a digital modulation system 22, depending upon whether one desires to use digital or analog modulation to convey the signal from the telemeter to the ground-station facility.

In the digital modulation system 22, a transmission link 24, a delta demodulator 26, and a display and record means 28 are provided. The transmission link 24 may be a digital-frequency modulated or frequency-shift, keyed, radio-frequency transmitter and receiver. The transmission link 24 may comprise an inductively coupled pair of transmitter and receiver coils.

In alternative analog modulation system 20, the Delta demodulator 26, the transmission link 24, and display and record means 28, are used. (Transmission link 24 may also either be radio frequency or inductive). The analog modulation system 20 would be used for applications where the electromagnetic noise environment could cause appreciable bit errors in the received binary sequence if the digital transmission system 22 were used.

Figure 2:
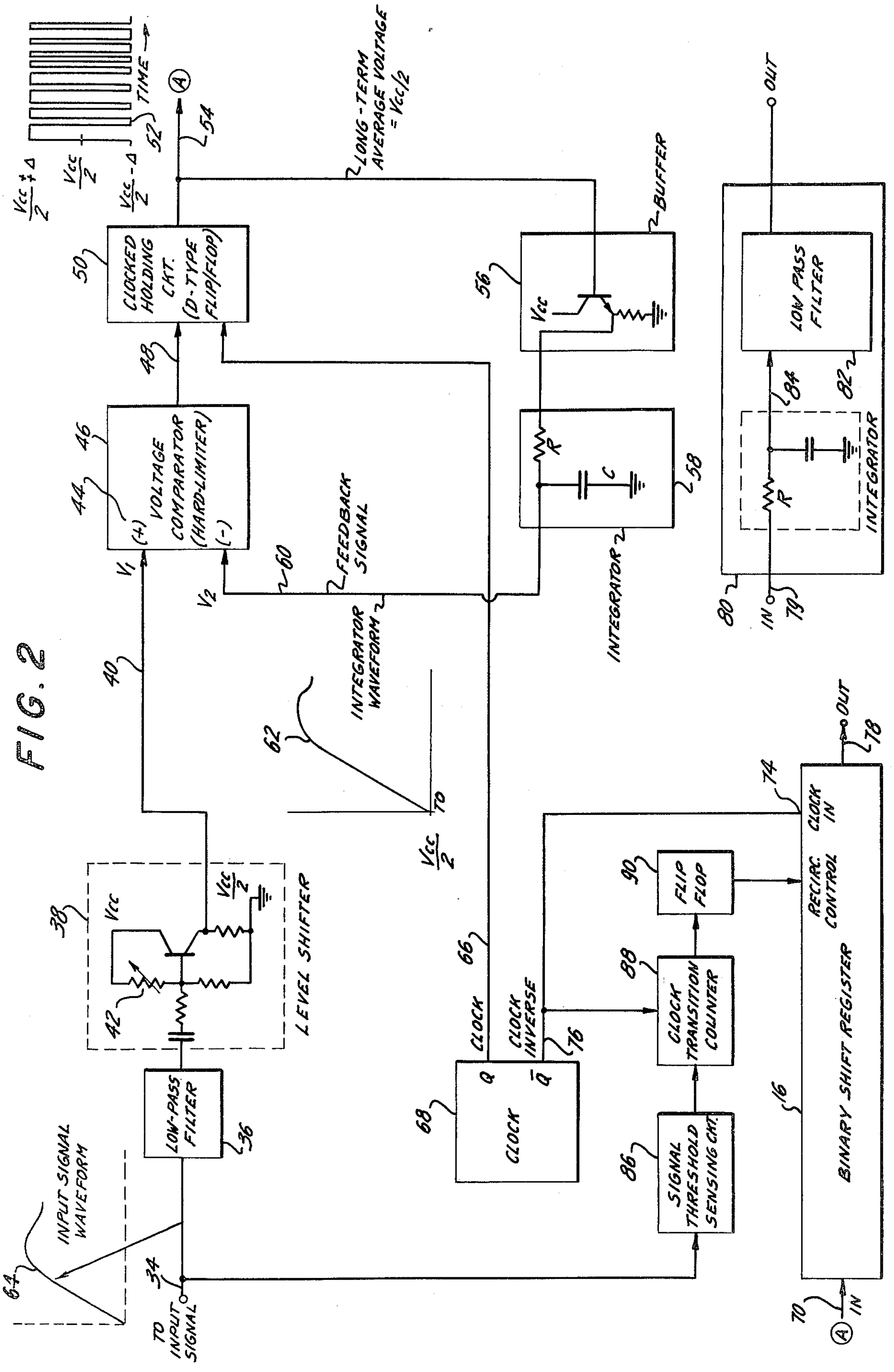
FIG. 2 is a block diagram illustrating the basic circuit configuration incorporating: the exponential delta-modulator used to perform an analog-to-digital conversion; the binary shift register used to delay digital information; the demodulator integrator and filter which performs the inverse function of the digital-to-analog conversion; and a decision circuit for switching to the recirculating mode of shift register operation once the entire sequence of in-bore data has been stored in the shift register.

FIG. 2 is a block diagram of a single channel circuit used in the present invention. A projectile-mounted transducer generated analog signal 34 is filtered by low-pass filter 36 which limits the top signal frequency FT to prevent DM encoder slope overload (the slope being the rate of the change of the signal voltage). The slope limitation arises because the DM is a waveform tracking device. Because it is desirable that the DM operate from a single polarity power source, it is necessary to shift the zero reference voltage level of the input signal to a point midway between ground potential and power source voltage Vcc. Level shifting circuit 38 translates the zero voltage input point to DC reference level Vcc/2 at point 40.

Resistor 42 is adjusted to allow for voltage offsets in DM components, while circuit 38 uses standard NPN-type transistor.

The filtered continuous analog signal (level shifted) at point 40 is fed to the plus input 44 of voltage comparator 46. The output 48 of comparator 46 is fed to a sample and hold circuit 50 which is a D-type clocked flip-flop. Circuit 50 generates a binary waveform 52 at point 54. This binary waveform is buffered by an emitter-follower 56 and is integrated by a local integrator 58. Integrator output 60 whose voltage waveform 62 is a stepwise approximation to input analog waveform 64 is fed to the minus input of the comparator 46. Circuits 46, 50, 56, and 58 form a closed-loop feedback system.

The flip-flop 50 samples the hard-limited signal at periodic clock intervals $Tc = 1/fc$, where fc is the clock rate. Logic level "one" at point 54 (having waveform 52) represents a positive increment of the input signal and, conversely, logic level "zero" represents a negative increment. The D-type flip-flop 50 transfers and holds (for one clock period) the logic level present at 48 to output 54 during the positive transition of clock output 66 of clock 68. Binary waveform 52 at point 54 has a long term average voltage equal to Vcc/2.

Local integrator output 60 consists of an exponential approximation to straight lines which have either positive or negative slopes of equal magnitude. The exponential output of the R-C circuit in integrator 58 is a very close approximation to the straight lines characteristic of an ideal integrator since the R-C time constant is large compared to the period of the lowest input signal frequency waveform. This exponential nature of the integrator 58 is the reason why the overall system is called an "Exponential Delta Modulator".

The binary output 54 of flip-flop 50, which is the digitally encoded representation of the input analog 64, is connected to input 70 of the N-stage binary shift register 16 which consists of integrator circuits, depending upon the required duration of time delay. The total time delay is directly proportional to N, the number of serial binary shift register stages.

Clock input 74 is the "Q" inverse output 76 of clock 68, this being because transitions in the binary logic levels at the input 70 occur almost simultaneously with positive transitions of the "Q" clock output 66 and, therefore, sufficient time should be allowed for shift register circuit propagation delays. The time delay, $T_D$ of the binary waveform at shift register output 78 is given by $T_D = N \times 1/Fc$, where Fc is a clock rate, and N is the number of shift register stages.

Analysis of the exponential modulator of FIG. 2 indicates that the maximum signal to quantization noise ratio (SQNR) improves at a rate of 9 db/octave with increasing clock rate, Fc, and the following relationship holds for sinusoidal input signals providing the DM is not slope-overloaded:

$$SQNR = \left( \frac{1}{8\pi^2 K} \times \frac{Fc^3}{Fs^2\, Fp} \right) \approx .04 \frac{Fc^3}{Fs^2\, Fp}$$

where:

K is a constant,

Fc is a clock rate

Fs is a frequency of input signal, and

Fp is a cutoff frequency of the low-pass input filter.

The digital bit stream representing the encoded in-bore data is easily decoded by decoder 72 which comprises an R-C integrator 80 and low-pass filter 82. The waveform at integrator output 84 is identical to waveform 62. The low pass filter 82 removes high frequency noise due to the step-wise nature of the integrator output 84 which has a strong spectral component at the clock frequency Fc at point 66.

The output of binary shift register 78 would be directly connected to the input 79 of decoder 72 if it is desired to use the analog modulation system alternative as discussed in FIG. 1 hereinabove. In the event that digital modulation transmission is employed, then the output of binary shift register 78 would couple to the digital transmission system 22 as shown in FIG. 1.

Since the input analog signal 34 is encoded to a binary digital form 52, it is easy to provide a binary shift register 16 as an optional device.

The repetitional capability, or recirculation of the binary S/R, is initiated immediately after the entire sequence of in-bore information has entered the shift register.

The decision to stop the transfer of new binary information from DM analog to digital encoder whose output is point 54, and to switch to the shift register binary recirculation mode, is accomplished in the following way:

The signal sensing circuit 86 detects the presence of analog signal 34 and initiates clock transition counter 88 which sets flip-flop 90 after N-clock cycles have occurred. (N is the number of shift register stages). When flip-flop 90 is set at a logical "one" or "high" level it is fed to shift register 16 to begin recirculating the entire binary sequence of encoded in-bore information. The sequence of in-bore information is then repeated indefinitely. Signal sensing circuit 86 includes a simple R-C filter to prevent false initiation of the recirculation mode by unwanted high frequency noise.

An alternative of signal sensing circuit 86 may be a logic circuit that senses the occurrence of two or more successive logical "ones" or "zeros" at DM encoder output 54.

The following advantages may be attained by incorporating the binary recirculation means:

(1) By continuously repeating the entire serial binary sequence representing in-bore information, the required duration of time delay is minimized. The time delay need only equal the expected duration of the in-bore events that occur only when the projectile is inside the gun tube. This minimal time delay requirement is contrasted to in-bore telemeters employing CCD analog delay devices whose total delay time must be long enough to cover:

(a) the time taken to clear the gun tube and ionized cloud;

(b) the time to allow all the receiving system tansients to decay; and (c) the time for the entire receiving and demodulating system to acquire and lock onto the transmitter signal from the telemeters (TM).

(2) By continuously repeating the entire serial binary sequence of in-bore data, the reliability of received in-bore data is improved.

Figure 3:
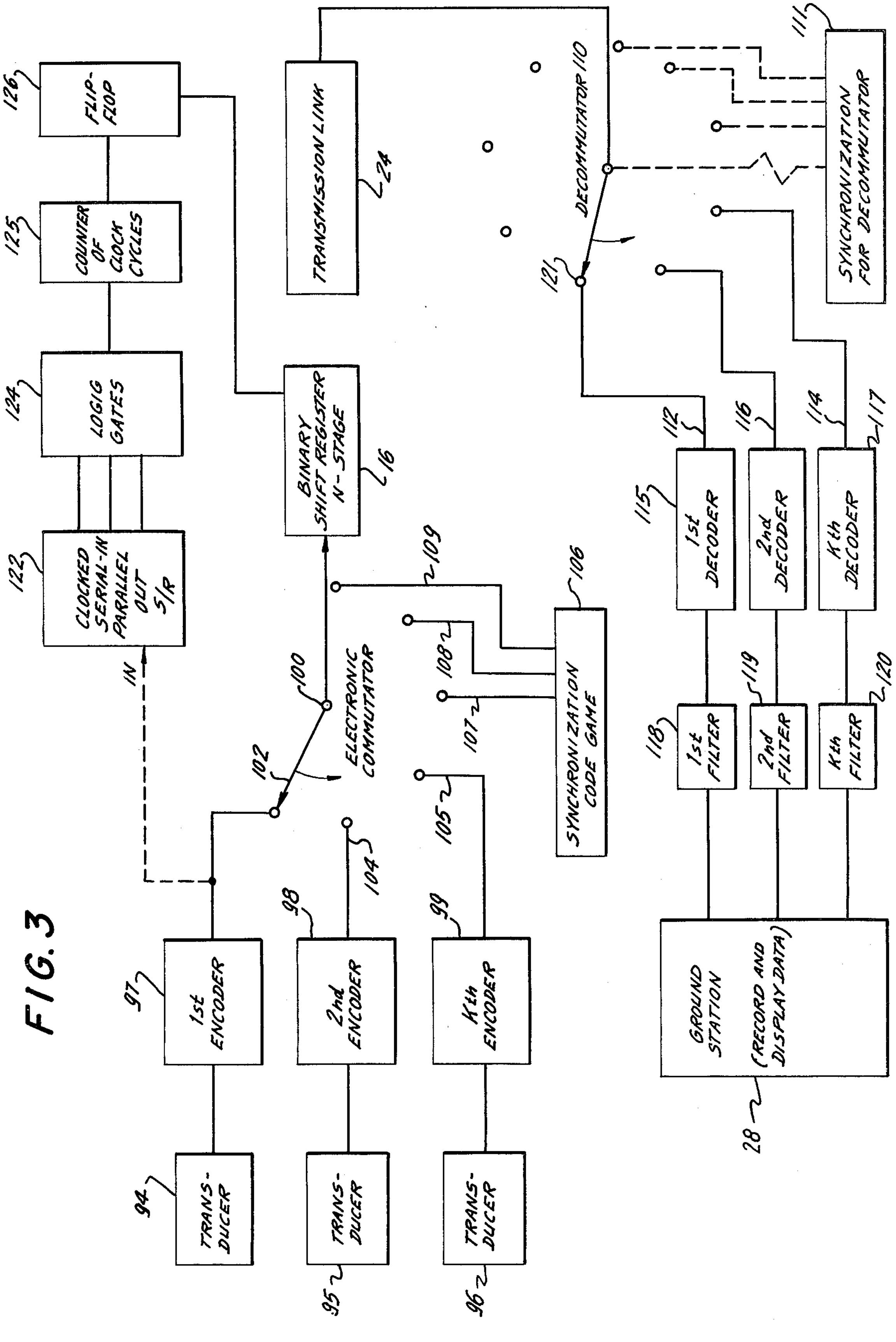
FIG. 3 is a block diagram showing a method of applying Time-Division-Multiplexing (TDM) to reduce overall telemeter hardware complexity.

FIG. 3 is a block diagram of a multichannel time division arrangement for telemetering in-bore data. Signals from one to k transducers 94 to 96 are converted to digital form by encoders 97 to 99. An electronic commutator 100 is in effect a rotary switch which, in each revolution, extracts a sample at 102 from each encoder output 103 to 105, and one or more samples of binary synchronization code from code from generator 106. One revolution of the commutator is made for each clock period of Delta Modulators 97 to 99.

It is noted that time division multiplexing (TDM) is a method for transmitting several information channels on one facility or on one transmission link by dividing the time domain into slots, one slot for each signal. This technique is useful for telemtering relatively low frequency bandwidth channels of information. By time sharing TM hardware, circuit complexity is reduced.

In the same manner described in connection with the circuit of FIG. 2, the binary shift register 16 delays the TDM serial bit stream. Transmission link 24 conveys the delayed information to the telemetry ground station 28 which includes items 110 to 121 as well as the telemetry receiver.

Decommutator 110 is in synchronization with TDM commutator 100 by means of a local synchronization circuit 111 which recognizes the proper transmitted binary synchronized sequence and adjusts the local decommutator 100 timing. Decoders 115 to 117 and respective filters 118 to 120 convert bit streams, at their respective inputs, to analog replicas of continuous signals. Ground station facility 28 is used to display and record the in-bore telemetry data.

After all transducer signals 94 to 96, generated only when the projectile is inside the gun bore, are encoded into a single time-multiplexed binary sequence, the binary shift register 16 contents may then be recirculated indefinitely. When in the recirculation mode, the in-bore information is repeated to obtain the performance advantages.

One way of determining when to switch S/R 16 over to the recirculation mode is to interrogate one of the DM encoder outputs 103 to 105. When no input signal is presented, the DM output will be a sequence of alternate "logic ones" and "logic zeros". If the input signal is increasing, more "ones" than "zeros" will be present. Conversely, an output will have more "zeros" than "ones" for a decreasing input signal.

Clocked serial-in parallel-out S/R 122 and logic-gate circuit 124 detect the presence of two or more successive "ones" or successive "zeros". Upon detection of two or more successive like logic levels in one of the DM outputs, clock cycle counter 125 is initiated. After counter 124 counts N clock cycles, N-stage shift register 16 is filled and flip-flop 126 is set, thereby commanding S/R 16 to switch to the recirculating mode of operation. This technique of interrogating the DM output to determine the initial presence of a transducer analog signal can also be applied to the signal-channel in-bore TM.

Slope overload occurs when the change in DM local integrator output ramp height, over one clock period, is not large enough to follow or track the change in input signal voltage occurring during the same clock period. The exponential DM experiences slope-overload when the maximum input signal $E_s$ max exceeds the level given by:

$$Es_{max} = \frac{\gamma\, Fc}{2\pi\, Fs}$$

where Fc=clock rate; Fs=input signal frequency; and $\gamma$=ramp height.

The Delta Modulation technique is an offspring of pulse-code modulation; it has the advance of greatly simplified hardware. However, for many applications where the input signals are characterized by a frequency spectrum decreasing with frequency, DM is a less costly alternative for encoding signals than any other known technique.

The performance of DM encoders may be significantly improved by use of adaptive techniques which may include the following approaches or combinations thereof:

(a) The step size or local integrator output ramp height of the DM feedback error signal can be automatically varied according to the instantaneous slope or rate of change of the input signal.

(b) The time-constant of DM integrators may be varied according to the amplitude or frequency of the signal.

(c) The DM may be made to operate asynchronously according to the input signal frequency or amplitude, for example, the DM clock could be increased to take a greater number of samples per second for increasing frequency or amplitude of input signals.

(d) The statistics of the input signal or of the encoded DM output binary sequence could be used to adaptively vary the DM process.

(e) The input signal amplitude may be adaptively companded.

In addition to the techniques mentioned above, the DM circuit may take alternative forms which offer certain performance advantages if certain tradeoffs may be accepted. Two of these techniques, namely, Delta-Sigma and double integration DM are described hereafter.

Figure 4:
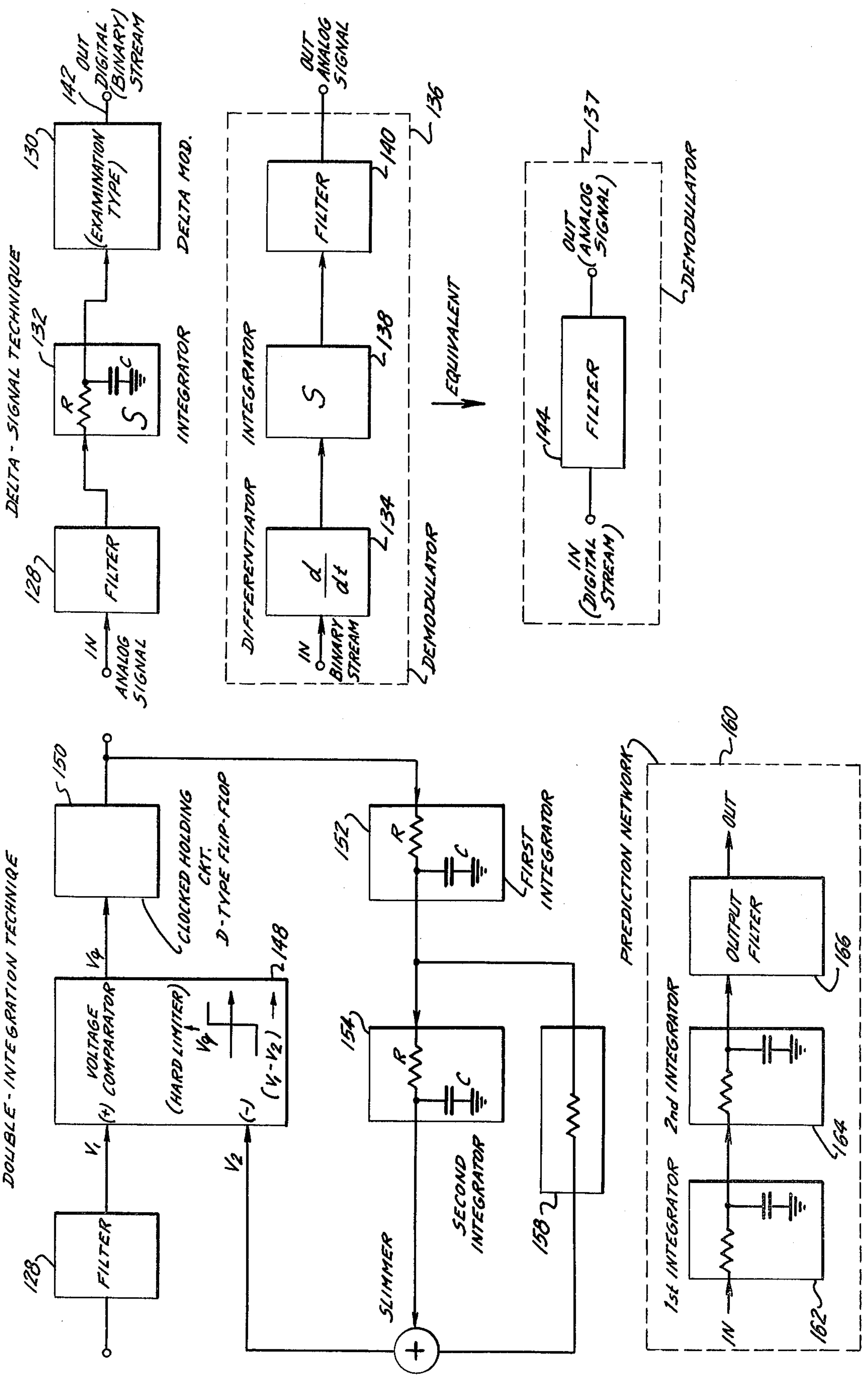
FIG. 4 is a block diagram of two alternative DM techniques, i.e., the double-integration technique; and the delta-sigma technique.

FIG. 4 is a block diagram showing the Delta Sigma and double integration techniques. The Delta Sigma encoder is comprised of filter 128 and a basic delta modulator 130 which is preceded by an integrator 132 which requires that a differentiator of matching inverse characteristic 134 be added to the demodulator signal path 136.

Since the differentiator 134 characteristic is the inverse of the integrator 138 characteristic, it is evident that both units 134 and 138 may be removed, leaving filter 140 as the only component necessary to demodulate binary bit stream at point 142. Only filter 144, therefore, need be present to remove high frequency and clocking noise above the signal passband.

The tradeoff which has to be considered when a Delta-Sigma DM is used is that the granular quantization system noise increases at a rate of +12 db/octave relative to the exponential DM. The quantization noise, when it occurs as a result of the encoder voltage and time quantization process, is due to the error signal in the feedback path resulting from the difference between the input signal waveform and locally generated feedback signal.

The performance advantage of the Delta-Sigma DM is that the slope overload characteristic is independent of input signal frequency. The maximum voltage $E_{sm}$ at which Delta-Sigma DM overload occurs is given by the relationship: $E_{smax}=\gamma \cdot F_{clock}$ where $\gamma$ is the ramp height change occurring over one clock period, and $F_{clock}$ is the clock frequency.

In comparison, the exponential DM overload characteristic is inversely proportional to frequency.

The double integration system consisting of components 146 to 158 and 162 to 166 offers improved tracking accuracy and lower quantization noise. The double integration differs from the DM of FIG. 2 in that a cascaded pair of integrators 152 and 154 with a preduction network 158 are used in lieu of a single channel integrator. The prediction network 158 in the DM feedback path is necessary to dampen, and control oscillary idling when the input signal is not changing. The double integrator DM shows a significant reduction of quantization noise of 5 to 10 db over the single integrator type DM (for clock rates 10–15 times the highest input signal frequency to be encoded). However, this improvement is traded off for a reduced peak signal slope-overload vs. frequency characteristic is given by the relationship:

$$E_{sm} = \frac{\gamma \cdot F_{clock}}{(2\pi\ Fs)^2}$$

where $E_{sm}$ is the maximum input signal level, $\gamma$ is the second integrator 16 output voltage change over one clock period, and $F_s$ is the input signal frequency.

It is thus seen that the objects described in the Summary of the Invention are efficiently attained by the systems of the invention as described above.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

I claim:

1. An improved electronic system for measuring in-bore telemetry information for tube-fired munitions where high frequency response up to 20 KHZ is acceptable to telemeter several frequency channels, comprising:

(a) means for sensing a plurality of levels of acceleration, said means disposed inside a tube-fired projectile;

(b) means for conditioning and filtering a signal input;

(c) means for converting analog data by a Delta-Modulation method;

(d) means for binary recirculation, said means accomplishing repetition of measurement of the in-bore information; and (e) a binary shift register for conveying input digital data to a ground-station facility through a transmission link.

2. The system as recited in claim 1, further comprising:

a recording means placed in ground station facility, wherein said recording means stores, displays and records said in-bore information.

3. The system as recited in claim 1 in which said acceleration sensing means comprises a transducer.

4. The system as recited in claim 1 in which said conditioning and filtering means comprises a low-pass filter, and an amplifier.

5. The system as recited in claim 1 in which said Delta-modulation method comprises a double-integration technique and Delta-Sigma technique.

6. The system as recited in claim 1 in which said binary recirculation means comprises:

(a) a sensing circuit to detect the presence of an analog signal;

(b) a binary counter to initiate clock transition; and (c) a flip-flop circuit to successively sample the binary sequence of the encoded in-bore information.

7. The system as recited in claim 1 in which said acceleration sensing means further comprises a switch-closure monitor.

8. The system as recited in claim 7 in which said acceleration sensing means further comprises a strain-gage.

9. The system as recited in claim 8 in which said acceleration sensing means further comprises an accelerometer.

10. The combination as recited in claim 6 in which said sensing circuit comprises a voltge comparator and an R-C filter, the same preventing false initiation of the recirculation means by high frequency noise.

11. The system as recited in claim 1 in which said transmission link comprises a digital frequency modulated transmitter and receiver.

12. The system as recited in claim 11 in which said transmission link further comprises a frequency shift keyed radio frequency transmitter and receiver.

13. The system as recited in claim 5 in which said Delta-modulation method further includes an improvement of DM encoders comprising:

(a) means for varying ramp height of the DM feedback error signal with respect to rate of change of an input signal;

(b) means for varying time-constant of the DM integrators with respect to an amplitude or frequency of an input signal; and (c) means for increasing a capacity of DM clock by controlling said DM clock with respect to the amplitude or the frequency of the input signal.

* * * * *